(12) United States Patent
Fowler

(10) Patent No.: US 8,553,160 B1
(45) Date of Patent: Oct. 8, 2013

(54) FLAT SCREEN TV DUST PROTECTOR DEVICE

(76) Inventor: Truman E. Fowler, Easley, SC (US)

( * ) Notice: Subject to any disclaimer, the term of this patent is extended or adjusted under 35 U.S.C. 154(b) by 610 days.

(21) Appl. No.: 12/843,315

(22) Filed: Jul. 26, 2010

(51) Int. Cl.
- *H04N 5/72* (2006.01)
- *H05K 5/00* (2006.01)
- *E04F 10/00* (2006.01)
- *E06B 9/08* (2006.01)
- *A47H 1/00* (2006.01)

(52) U.S. Cl.
USPC ............. 348/836; 361/724; 160/23.1; 160/31

(58) Field of Classification Search
None
See application file for complete search history.

(56) References Cited

U.S. PATENT DOCUMENTS

| | | |
|---|---|---|
| 2,824,606 A | 2/1958 | Lorentzen |
| 4,120,474 A | 10/1978 | Hurley |
| 4,183,487 A | 1/1980 | Swain |
| D266,482 S | 10/1982 | Goldstein |
| 4,782,554 A | 11/1988 | Lawson |
| 4,999,874 A | 3/1991 | White |
| 5,232,039 A | 8/1993 | Shapiro et al. |
| 5,505,418 A | 4/1996 | Corcoran |
| 5,529,273 A | 6/1996 | Benthin |
| D393,771 S | 4/1998 | Saffels |
| 5,775,656 A | 7/1998 | Roberts et al. |
| D454,646 S | 3/2002 | Bushnell et al. |
| 6,532,625 B1 | 3/2003 | Stone |
| 7,134,470 B2 | 11/2006 | McCance |
| 2005/0161169 A1 | 7/2005 | Webb |
| 2007/0046841 A1* | 3/2007 | Jacobsmeyer et al. ........ 348/836 |
| 2008/0049400 A1* | 2/2008 | Pecorino et al. ............. 361/724 |
| 2008/0230186 A1* | 9/2008 | Briggs et al. .................... 160/38 |
| 2009/0273660 A1* | 11/2009 | Regen et al. ................ 348/14.02 |

* cited by examiner

*Primary Examiner* — Joseph Ustaris
*Assistant Examiner* — Edemio Navas, Jr.

(57) ABSTRACT

A flat screen television dust protector device featuring an elongated base configured to surround a top area of a flat screen television; at least one mounting bracket disposed on the top dust panel, the first side panel, or on the second side panel of the base, the mounting bracket functions to mount the base to a wall; and a support bar disposed on the top dust panel, the support bar extends downwardly and generally perpendicular to the top dust panel and generally parallel to the front panel, wherein at least on aperture is disposed in the support bar adapted to receive a screw, bolt, or nail, wherein the support bar functions to provide support for the base when the base is attached to the wall.

6 Claims, 5 Drawing Sheets

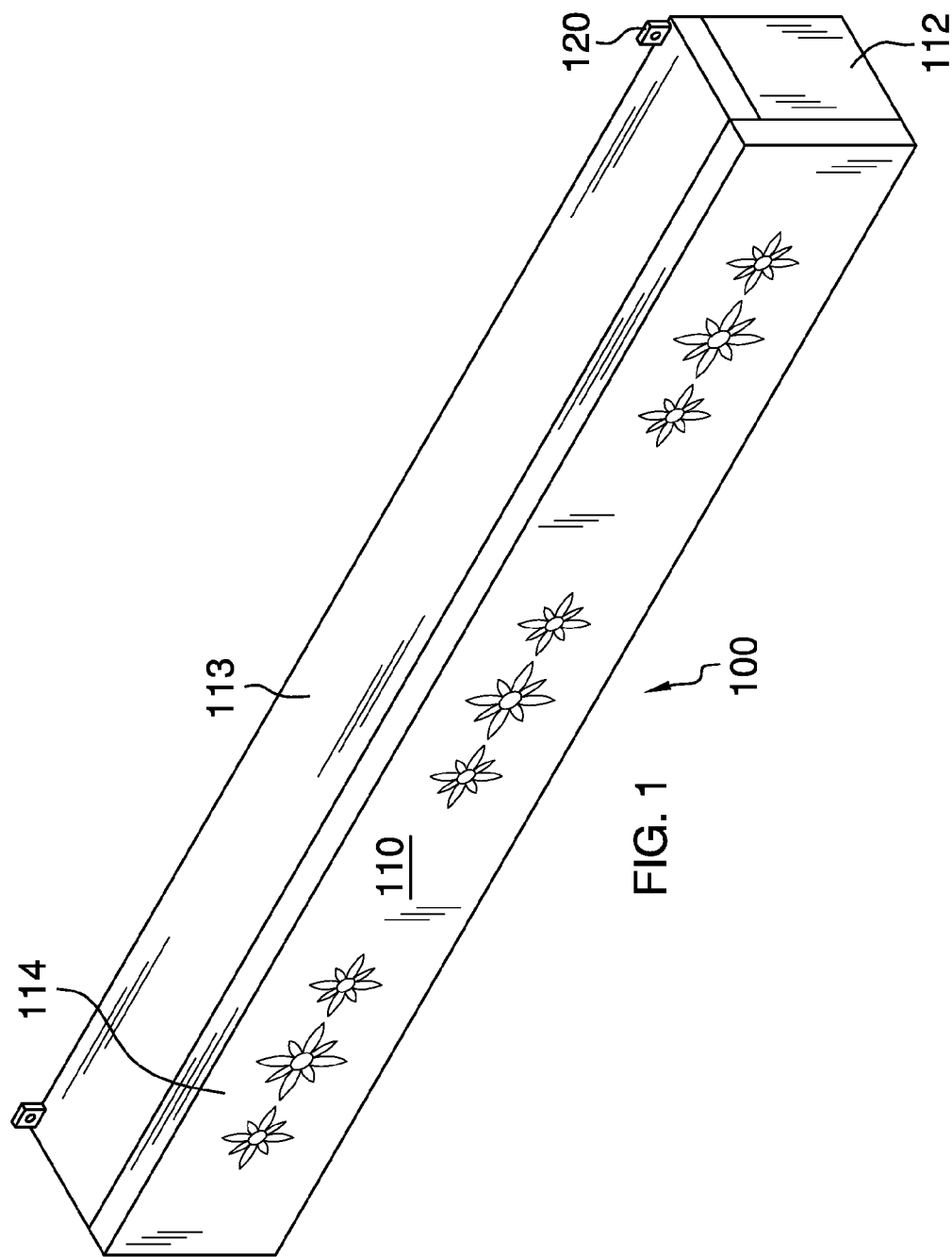

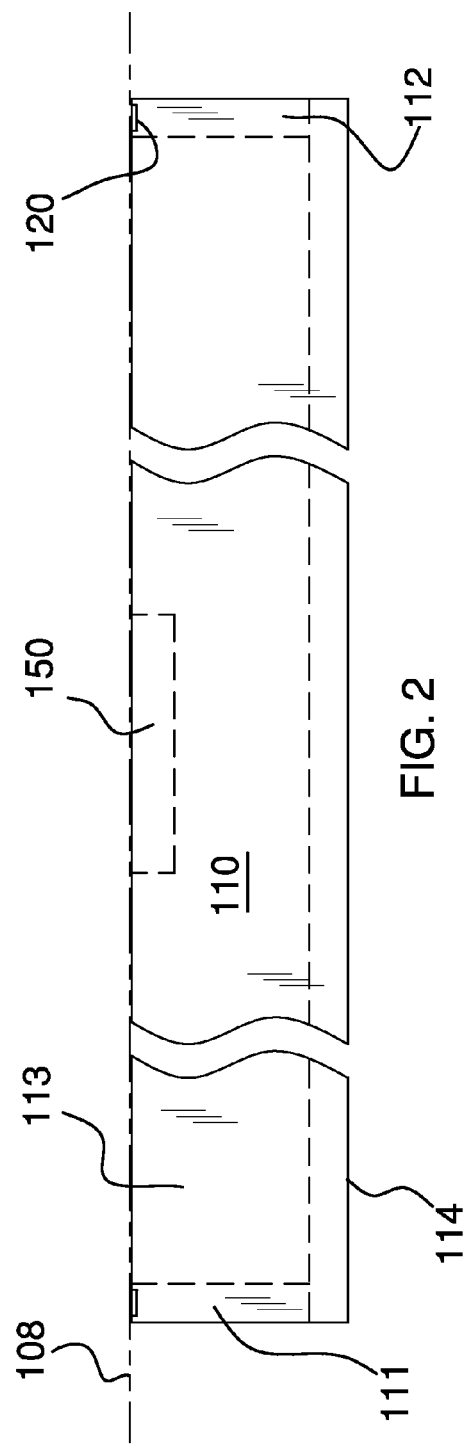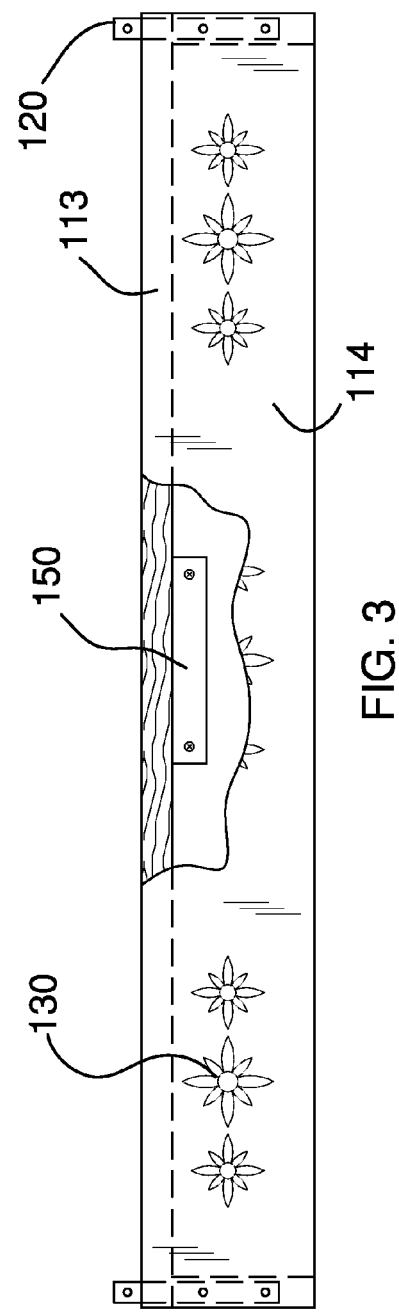

FLAT SCREEN TV DUST PROTECTOR DEVICE

FIELD OF THE INVENTION

The present invention is directed to decor and fixtures for homes and in hotels, motels, and other businesses, more particularly to a device for protecting flat screen televisions from dust, for example flat screen televisions that are bolted to a wall surface. The device also provides a shelf for storage, for example storing knick-knacks.

BACKGROUND OF THE INVENTION

Tops of flat screen televisions can sometimes be unsightly and require frequent dusting or replacement. The present invention features a dust protector device for flat screen televisions. The device can help to hide and protect the tops of flat screen televisions (e.g., those bolted to a wall). The device can help enhance the appearance of flat screen televisions as well as help prevent premature replacement. The device also provides a user with additional storage space for storing and displaying knick-knacks and/or other household items. The device can also be used in other locations such as hotels, motels, and other businesses.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the flat screen TV dust protector device of the present invention.

FIG. 2 is a top view of the flat screen TV dust protector device of FIG. 1. A support block is shown in phantom.

FIG. 3 is a front view of the flat screen TV dust protector device of FIG. 1.

DESCRIPTION OF PREFERRED EMBODIMENTS

Figure 4:
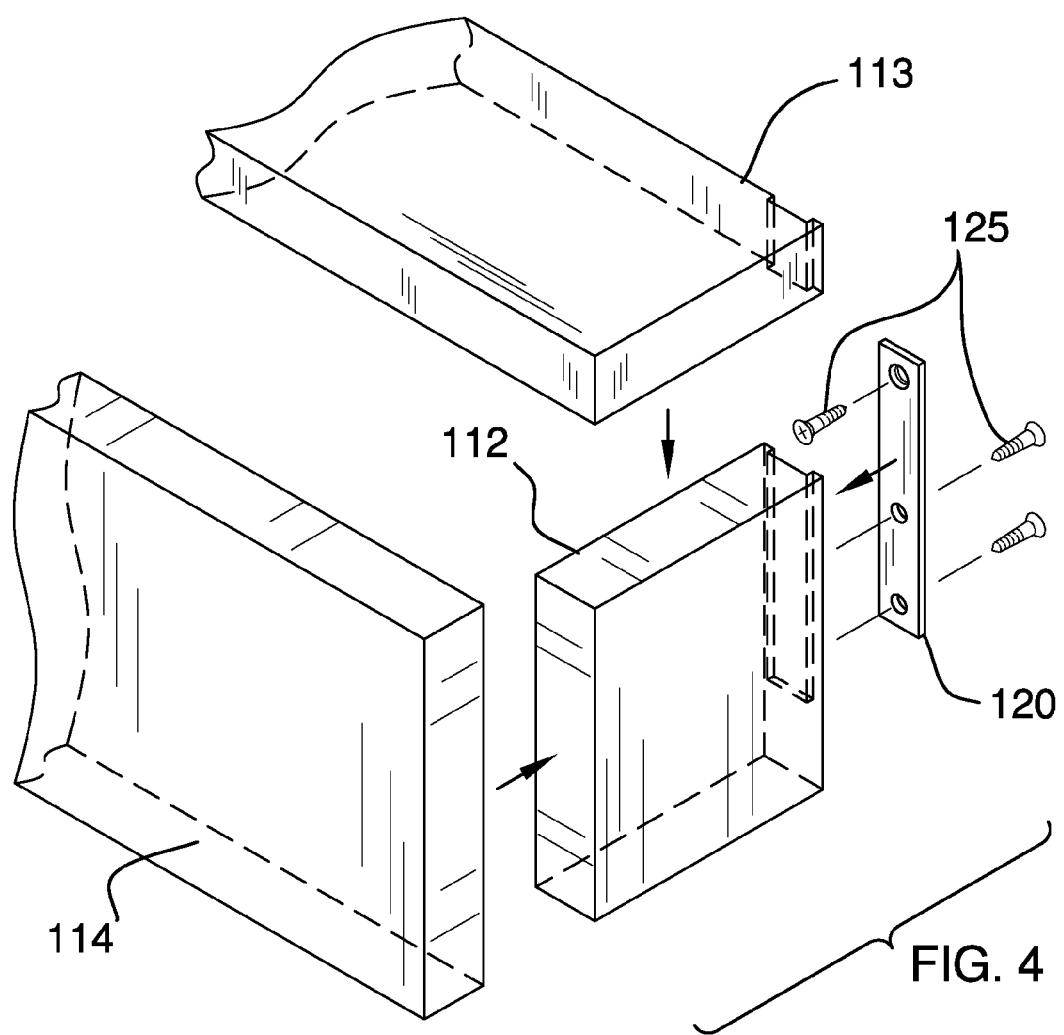
FIG. 4 is an exploded view of the flat screen TV dust protector device of FIG. 1.

Referring now to FIG. 1-6, the present invention features a flat screen TV dust protector device 100 for helping to hide and protect tops of flat screen TV's and curtains to protect the front of flat screen televisions. The flat screen TV dust protector device 100 will help enhance the top appearance of the flat screen TV's, as well as prevent premature replacement. In all embodiments, the flat screen TV dust protector device 100 provides a user with additional storage space for storing and displaying household items and knick-knacks.

The flat screen TV dust protector device 100 comprises an elongated base 110 having a top dust panel 113, a first side panel 111, a second side panel 112, and a front panel 114 (e.g., designated front panel). The top dust panel 113, the first side panel 111, the second side panel 112, and the front panel 114 (e.g., designated front panel) together form an inner cavity. The base 110 is configured to surround the top of flat screen televisions.

The base 110 may be constructed in a variety of sizes. In some embodiments, the base 110 is between about 2 to 3 feet in width as measured from the first end of the top dust panel 113 to the second end of the top dust panel 113. In some embodiments, the base 110 is between about 5-7 feet in width. In some embodiments, the base 110 is between 7-9 feet in width. In some embodiments, the base 110 is 9-11 feet in width. In some embodiments, the base 110 is more than 11 feet in width.

The base 110 can be attached to a wall IDS around the top of a flat screen television via an attachment means. In some embodiments, one or more mounting brackets 120 are disposed on the base 110, for example on top dust panel 113 and\or the first side panel 111 and\or on the second side panel 112. As shown in FIG. 1, two mounting brackets 120 are disposed on the top dust panel 113 of the base 110.

As shown in FIG. 2 and FIG. 3, a support bar 150 may be disposed on the top dust panel 113. The support bar 150 may extend downwardly (e.g., generally perpendicularly to the top dust panel 113 and parallel to the front panel 114). The support bar 150 may provide support for the base 110 while attached to the wall IDS. In some embodiments, the support bar 150 provides an additional means of securing the base 110 to the wall IDS. For example, apertures may be disposed in the support bar 150, which are adapted to receive screws and\or bolts and\or nails. The screws and\or bolts and\or nails can be used to attach the base 110 to the wall IDS.

As shown in FIG. 3, in some embodiments the base 110 (e.g., the front panel 114) comprises a decoration or design 130. The base 110 may be constructed in a variety of shapes and be designed in a number of ways.

FIG. 4 shows an exploded view of the base 110, wherein the second end of the top dust panel 113 is attached to the second side panel 112, and the second end of the front panel 114 is also attached to the second side panel 112. The mounting bracket 120 can be attached to the second side panel 112 via mounting hardware 125. The mounting bracket 120 can also be attached to the top dust panel 113. Mounting hardware may also be used to attach the mounting bracket to the wall 108.

Figure 5:
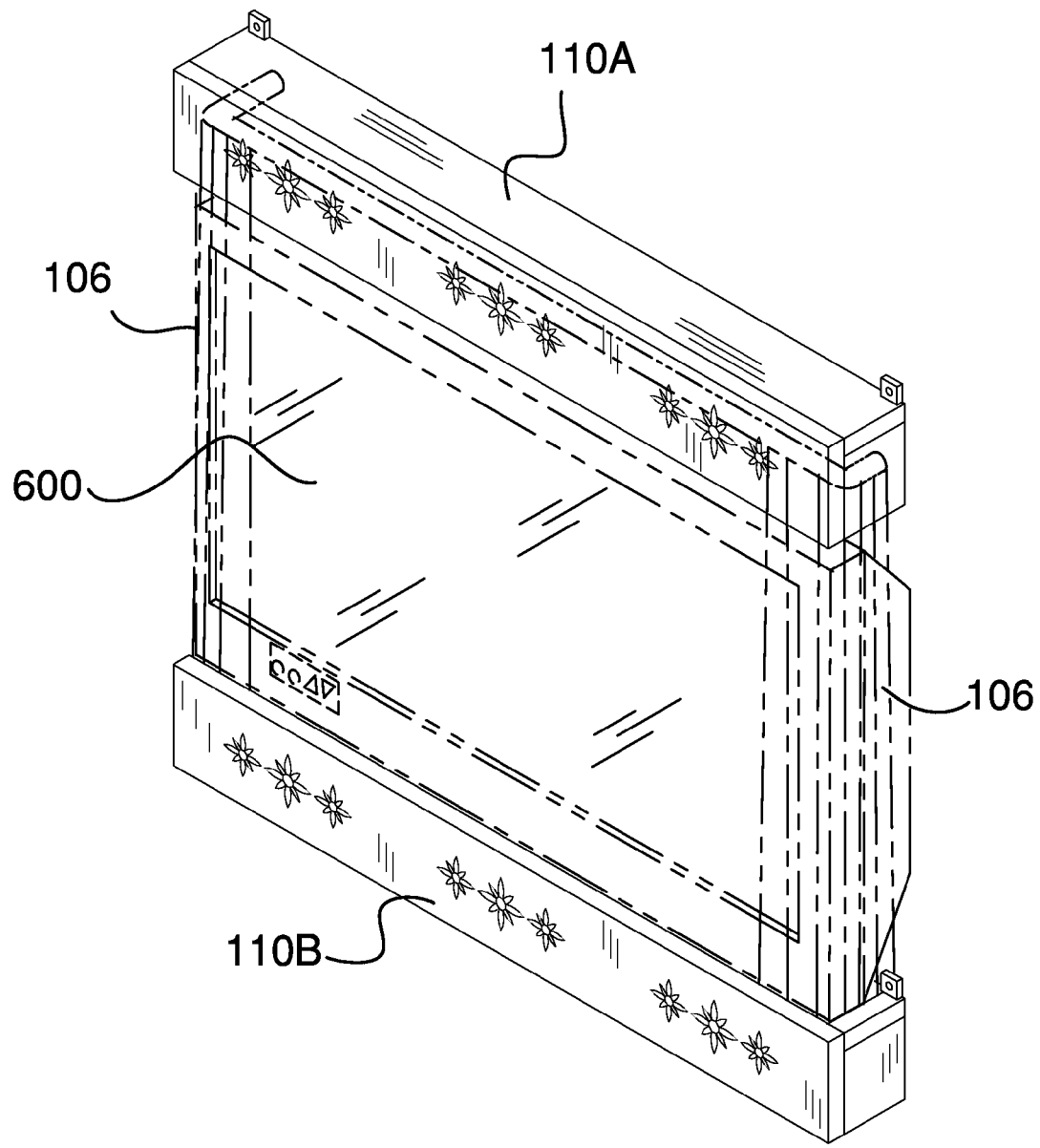
FIG. 5 is a perspective in-use view of the flat screen TV dust protector device of the present invention.
Figure 6:
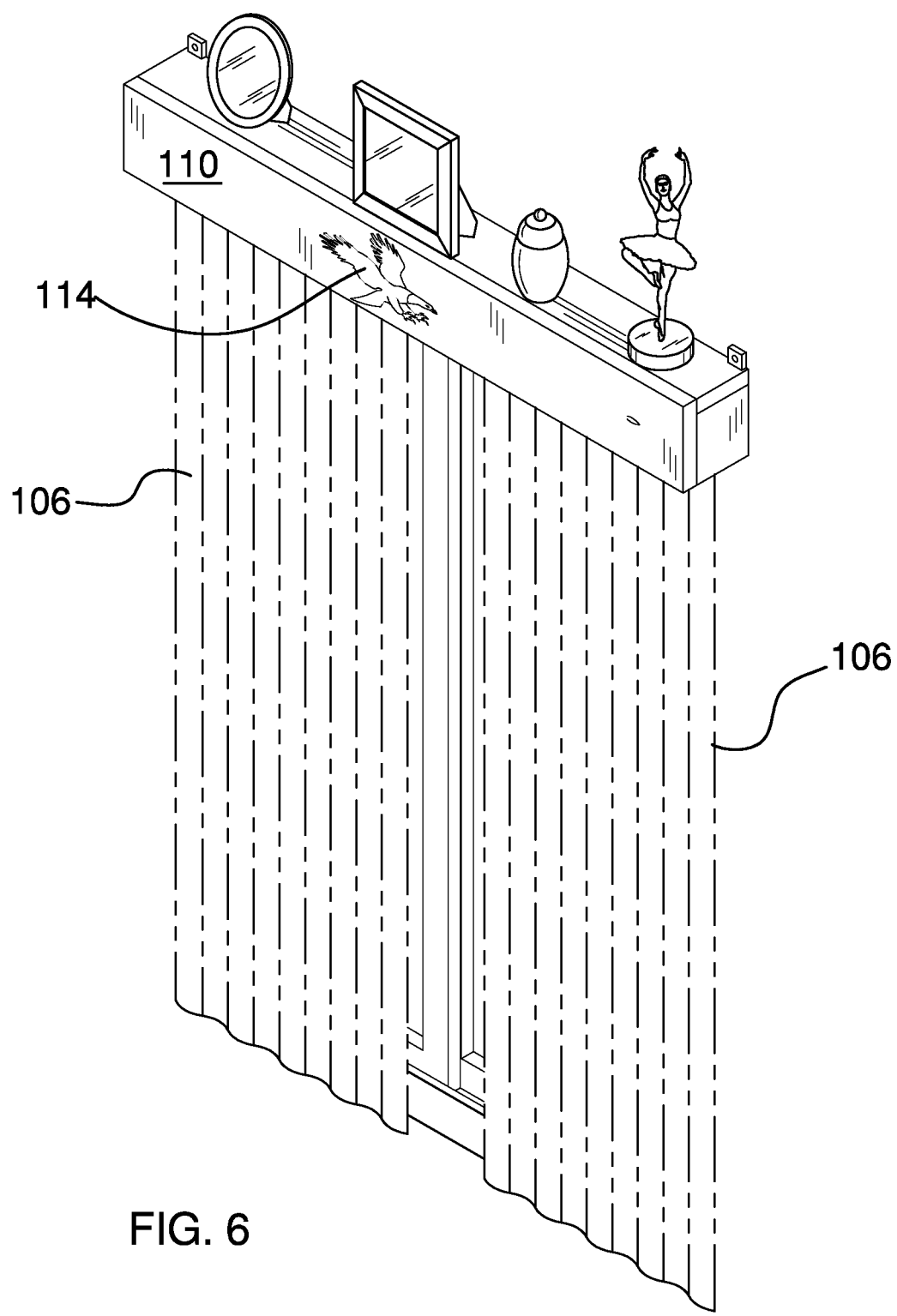
FIG. 6 is an alternative embodiment of the flat screen TV dust protector device of the present invention, wherein a first is used above the flat screen television and a second device is used below the flat screen television.

As shown in FIG. 5, the base 110 can be attached to a wall 108 around a curtain and flat screen television. As shown in FIG. 5, the base 110 can be attached to a wall around a flat screen television, wherein curtains 106 are also used. The flat screen television can hang downwardly undisturbed. The top dust panel 113 can also function to display household items and knick-knacks. In some embodiments, two bases 110a and 110b are used in the device. For example, a first base 110a is placed above the flat screen television 600 and a second base 110b is placed below the flat screen television 600. The curtains 106 can hang from base 110a, and the bottom of the curtains are inside the base 110b, so that the television can be completely covered by the closed curtains. This arrangement can provide a balanced appearance if desired.

The present invention also features a method of helping to protect a wall mounted flat screen television from dust. In some embodiments, the method comprises obtaining a flat screen television dust protector device of the present invention and attaching the base to a wall above a flat screen television such that a top area of the flat screen television is positioned inside the inner cavity of the base.

As used herein, the term "about" refers to plus or minus 10% of the referenced number. For example, an embodiment wherein the base 110 is about 5 feet in width includes a base that is 4.5 and 5.5 feet in width.

The following disclosures of the following U.S. Pat. No. 2,824,606; U.S. Pat. No. 4,782,554; U.S. Pat. No. 4,999,874; U.S. Pat. No. 5,259,520; U.S. Pat. No. 20050161169; U.S. Pat. No. 4,120,474; U.S. Pat. No. 4,183,487; U.S. Pat. No. 5,232,039; U.S. Pat. No. 5,505,418; U.S. Pat. No. 5,529,273; U.S. Pat. No. 5,775,656; U.S. Pat. No. 6,532,625; U.S. Pat. No. 7,134,470.

Various modifications of the invention, in addition to those described herein, will be apparent to those skilled in the art from the foregoing description. Such modifications are also intended to fall within the scope of the appended claims. Each reference cited in the present application is incorporated herein by reference in it's entirety.

Although there has been shown and described the preferred embodiment of the present invention, it will be readily apparent to those skilled in the art that modifications may be made thereto which do not exceed the scope of the appended claims. Therefore, the scope of the invention is only limited by the following claims.

What is claimed is:

1. A flat screen television dust protector device consisting of:
   (a) an elongated base having a top dust panel, a first side panel, a second side panel, a front panel, and an inner cavity formed by said panels, the base has an open bottom, the base is configured to surround a top area of a flat screen television;
   (b) at least one mounting bracket disposed on the top dust panel, the first side panel, or on the second side panel of the base, the mounting bracket functions to mount the base to a wall;
   (c) a support bar disposed on the top dust panel, the support bar extends downwardly and generally perpendicularly to the top dust panel and generally parallel to the front panel, wherein at least one aperture is disposed in the support bar adapted to receive a screw, bolt, or nail, wherein the support bar functions to provide support for the base when the base is attached to the wall;
   (d) curtains extending downwardly from the elongated base;
   (e) a lower base having a bottom dust panel, a first side panel, a second side panel, a front panel, and an inner cavity formed by said panels, the lower base has an open top, the lower base is configured to surround a bottom area of a flat screen television and a bottom area of the curtains; and
   (f) at least one mounting bracket disposed on the bottom dust panel, the first side panel, or on the second side panel of the lower base, the mounting bracket functions to mount the lower base to a wall.

2. The device of claim 1, wherein the elongated base and the lower base comprise a decoration or design.

3. The device of claim 1, wherein the elongated base is between about 2 to 5 feet in width as measured from a first end of the top dust panel to a second end of the top dust panel and the lower base is between about 2 to 5 feet in width as measured from a first end of the bottom dust panel to a second end of the bottom dust panel.

4. The device of claim 1, wherein the elongated base is between about 5 to 11 feet in width as measured from a first end of the top dust panel to a second end of the top dust panel and the lower base is between about 5 to 11 feet in width as measured from a first end of the bottom dust panel to a second end of the bottom dust panel.

5. The device of claim 1 wherein, two mounting brackets are disposed on the top dust panel of the elongated base and two mounting brackets are disposed on the bottom dust panel of the lower base.

6. The device of claim 1, wherein the mounting bracket is attached to the top dust panel, the first side panel, or the second side panel of the elongated base via mounting hardware and another mounting bracket is attached to the bottom dust panel, the first side panel, or the second side panel of the lower base via mounting hardware.

* * * * *